United States Patent [19]

Deambrosio

[11] Patent Number: 5,125,556
[45] Date of Patent: Jun. 30, 1992

[54] INERTED IR SOLDERING SYSTEM

[75] Inventor: Carlos A. Deambrosio, Laprairie, Canada

[73] Assignee: Electrovert Ltd., La Prairie, Canada

[21] Appl. No.: 591,118

[22] Filed: Oct. 2, 1990

Related U.S. Application Data

[63] Continuation-in-part of Ser. No. 583,944, Sep. 17, 1990, abandoned, which is a continuation-in-part of Ser. No. 537,424, Jun. 13, 1990, Pat. No. 5,069,380.

[51] Int. Cl.⁵ .................... B23K 1/008; B23K 3/00; F24F 9/00
[52] U.S. Cl. ........................................ 228/42; 228/43; 228/219; 432/64
[58] Field of Search ............... 228/42, 43, 180.2, 214, 228/219, 20; 219/388, 395, 398, 537; 118/62, 63; 432/64

[56] References Cited

U.S. PATENT DOCUMENTS

| | | | |
|---|---|---|---|
| 3,364,286 | 1/1968 | Hanks | 432/64 |
| 3,575,398 | 4/1971 | Lincoln et al. | 432/64 |
| 3,724,418 | 4/1973 | McLain | 228/37 |
| 3,865,298 | 2/1975 | Allen et al. | 228/20 |
| 4,315,042 | 2/1982 | Spigarelli | 228/20 |
| 4,580,716 | 4/1986 | Barresi et al. | 228/219 |
| 4,898,319 | 2/1990 | Williams | 228/219 |
| 5,031,818 | 7/1991 | Gieskes | 228/42 |

FOREIGN PATENT DOCUMENTS

| | | | |
|---|---|---|---|
| 579187 | 7/1946 | United Kingdom | 432/64 |
| 906349 | 9/1962 | United Kingdom | 432/64 |

Primary Examiner—Samuel M. Heinrich
Attorney, Agent, or Firm—Darby & Darby

[57] ABSTRACT

An infrared soldering machine has an inert gas atmosphere to prevent oxidation of the solder. Heaters positioned within the machine housing above a conveyor have through apertures and fans direct inert gas down through the heaters onto the conveyor. The forced convection assists in maintaining uniform temperature across the conveyor. In order to prevent leakage of ambient air into the housing where the fan shafts protrude for connection to electric motors, a gas seal is provided at each fan shaft. The seal extends between two spaced bearings rotatably securing the fan shaft. Each electric motor is mounted away from the heat of the machine and is connected to the respective fan shaft by means of a belt drive. A novel gas curtain, which may be clamped at different angles, improves the gas seal at entry and exit locations of the conveyor.

17 Claims, 11 Drawing Sheets

under the best of circumstances and more work, the present invention.

INERTED IR SOLDERING SYSTEM

CROSS-REFERENCE TO RELATED APPLICATION

The present application is a continuation-in-part of copending application Ser. No. 583,944 filed on Sep. 17, 1990 and now abandoned, wich is in turn a C.I.P. of application Ser. No. 537,424, filed on Jun. 13, 1990 now U.S. Pat. No. 5,069,380.

BACKGROUND OF THE INVENTION

This invention relates to automatic soldering machines for soldering components on printed circuit boards.

Some PCB's do not have through holes and these are known as surface mount devices (SMD's). A preferred soldering technique for SMD's is infrared (IR) reflow in which solder paste on the PCB's is caused to reflow upon the application of heat. More particularly, heating takes place in separately controlled zones within the machine permitting precise temperature profiling. The boards pass by wire mesh conveyor first into a preheat zone which gently heats the solder paste to drive off volatile solvents and avoid thermal shock to the PCB's. After preheating, the PCB's pass into the main heating zones where they are raised to reflow temperature. On exiting from the heating zones the boards are cooled, typically by blowing air up through the conveyor mesh, to solidify the solder joints.

In a development of this technique, automatic soldering machines have been designed in which the IR heating is supplemented with forced convection. In one such machine marketed by the assignee of the present application, blowers are provided above a top row of heaters which are perforated so that hot air is blown on to the PCB's.

So as to reduce or eliminate problems caused by oxidation of the solder paste it has been proposed that, instead of air, an inert gas such as nitrogen should be used for the atmosphere inside the heating zones and that forced convection would involve blowing the inert gas rather than air.

SUMMARY OF THE INVENTION

It is an object of the present invention to provide a forced convection soldering machine of this type in which the problem of air being sucked into the machine where the fan shaft enters the heating chamber is avoided or reduced. This is achieved by providing a sealed housing around the fan shaft and filling the housing with an inert gas, preferably the same as in the heating chamber, to a pressure greater than the pressure in the heating chamber.

It is another object of the invention to avoid the problem of heat from the soldering machine adversely affecting the fan motor and thereby shortening its life. This is achieved by locating the motor remote from the heating chamber and interconnecting the motor output shaft with the fan shaft by means of drive belt, gearing or the like.

It is another object to the invention to provide an improved heater-gas distribution chamber for an infrared furnace.

It is yet another object of the invention to provide an improved inert gas diffuser arrangement in an infrared furnace.

It is another object of the invention to provide an improved gas curtain for sealing the entrance and exit of the conveyor tunnel of an inerted soldering machine.

DESCRIPTION OF THE PREFERRED EMBODIMENTS

Figures 1, 2:
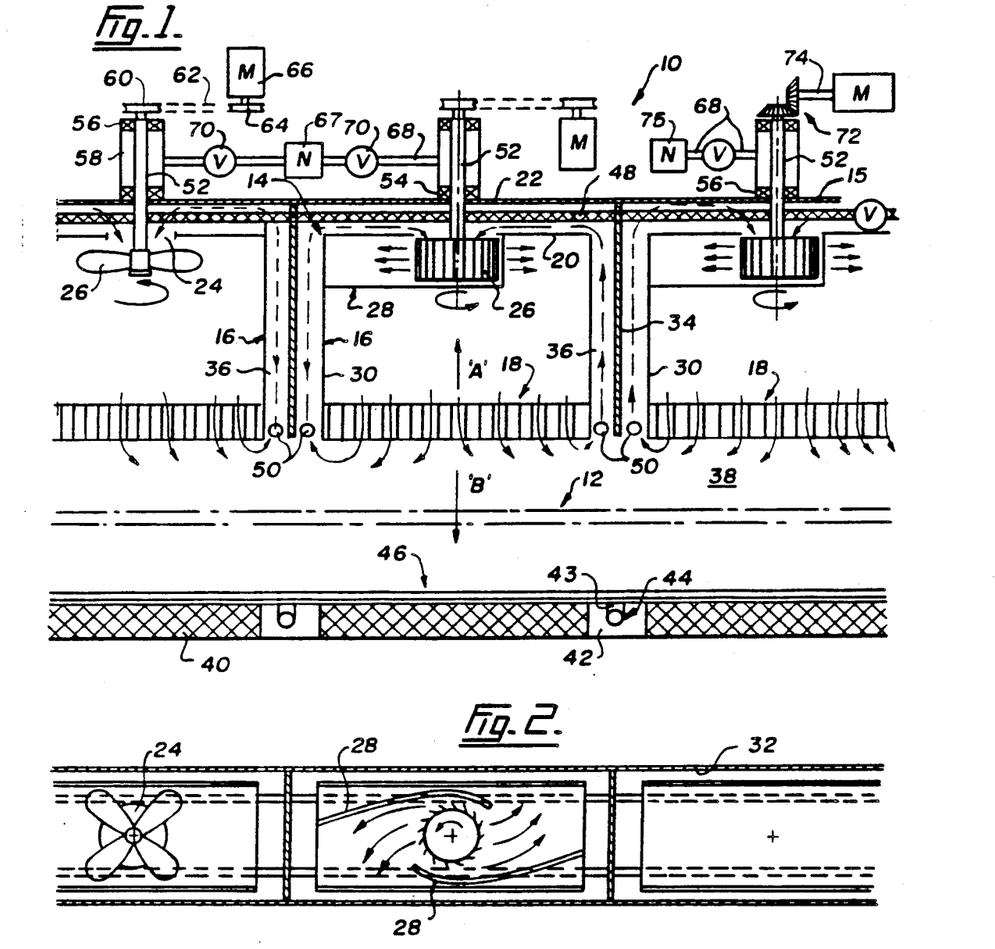
FIG. 1 is a schematic view showing in longitudinal section part of an IR reflow soldering machine embodying the invention.
FIG. 2 is a schematic sectional view looking in the direction of arrow A in FIG. 1.

With reference to FIG. 1, an IR soldering machine 10 according to the invention includes a wire mesh conveyor 12 for carrying printed circuit boards (not shown) of the SMD type from left to right through a series of heater zones 14 enclosed within a sheet metal housing 15.

The major part of each heating zone 14 is constructed as an individual module which is arranged to be controlled independently of the other modules. Each module comprises a generally box-shaped sheet metal housing 16 having a lower end closed by an apertured heater panel 18 and an upper end 20 which is spaced from the roof 22 of the housing 15. An aperture 24 is provided centrally in the upper end 20 and serves as an inlet port to a fan 26 which is suspended inside the housing 16 adjacent aperture 24. The fan may be a propeller type as shown in the left hand module or may be a fluted type as shown in the other two modules, this being the preferred form. To control turbulence in the fluted type a curved depending skirt 28 is provided.

The sides 30 of housing 16 are spaced from the sides 32 of housing 15 and from vertically disposed separator plates 34 which are located between successive pairs of modules. The spaces thus formed serve as channels 36 for circulation of gas to the inlet port 24 of the fan from the area of the conveyor 12. The channels 36 need not be rectangular in section and, indeed, circulation of the gas may be improved by contouring the channels. Furthermore, the gas channel 36 need not be provided on all four sides of housing 16. For example, the channel could be provided only at the front and rear (right and left in FIG. 1) of each module.

All of the apertured heater panels 18 are aligned in the same plane and define the roof of a tunnel 38 through which the conveyor 12 passes. The floor of the tunnel is defined by non-apertured coplanar heater panels 40 each of which is aligned with a respective module and completes a heating zone 14. Between each successive pair of heater pannels 40 is spacer 42 which has a transverse slot 43 receiving a transverse diffuser pipe 44 connected to two spaced longitudinal diffuser pipes 46 running along the floor of the tunnel adjacent opposite edges of the heater panels 40. The longitudinal diffuser pipes 46 are connected to a source (not shown) of inert gas such as nitrogen and a pump (not shown) so that an even blanket of inert gas can be pumped into the conveyor tunnel.

Running along the space between the upper end 20 of housing 16 and the roof 22 of housing 15 in the lengthwise direction of the conveyor tunnel is a pair spaced diffuser pipes 48. These are optional and are provided to assist in the speedy purging of oxygen from the system at start up.

Also shown in the gas channels 36 adjacent the separator plates 34 and the apertured heater elements 18 are transversely disposed horizontal diffuser pipes 50. These are also optional and may be connected either to diffuser pipes 46 or 48 by means of vertical pipe sections (not shown) at each end of the horizontal pipes 50. Other configurations are also possible. The various diffuser pipes may be a sintered metal type similar to those disclosed in U.S. application Ser. No. 441,009.

The entrance (left hand side of FIG. 1) and exit (right side of FIG. 1) of the conveyor tunnel are sealed at least partially by means such as gas curtains, mechanical doors or the like. One particularly effective gas curtain, illustrated in FIG. 13, will be described later.

In operation, insert gas, which may be preheated, is pumped into the machine, the heater panels 18 and 40 are energized, the fans 26 are started and the conveyor 12 moves printed circuit boards along the tunnel. The inert gas is forced down through the apertured panels 18 and back up the gas channels 36 as indicated by the arrows, the forced convection assisting in ensuring even heating across the conveyor 12.

Each fan 26 is driven by a fan shaft 52 which is disposed vertically and passes through respective apertures 54 in the roof 22 of housing 15. Each shaft 52 is supported on two spaced bearing 56 the lower of which is adjacent the roof 22 of housing 15. A cylindrical housing 58 receives the fan shaft 52 concentrically therethrough and sealably encompasses the bearings 56 which are located at opposite ends of the housing 58. The upper end of each fan shaft 52 is provided with a pulley 60 which is connected by means of a drive belt 62 to a pulley 64 mounted on the drive shaft of an electric motor 66 mounted remotely with respect to the machine 10. A source of inert gas such as nitrogen is connected to the housing 56 via pipes 68 and pumps 70 to supply the housing 56 with inert gas at a pressure greater than that inside the housing 15.

The cylindrical housing 58 thus acts as a gas seal preventing air from leaking through the bearings and along the fan shaft 52 and inside housing 15.

Instead of a belt drive, the interconnection between the fan shaft 52 and the motor drive shaft may be achieved using bevel gears 72 and a long drive shaft 74 as seen on the right hand side of FIG. 1.

The heater panels 18 may take different forms. For example each panel 18 may take the composite form shown in FIG. 4 in which an apertured infrared heating panel 76 of the type available as Electrovert Part No. 3-0759-145-01-4 is secured in abutment to the upper face of a perforated aluminum plate 78, the holes 80 of the panel 76 registering with the holes 82 of the plate 78. Spaced above panel 76 is a perforated aluminum plate 84 which defines a chamber 86. Plate 84 has holes 88 which are deliberately offset with respect to the holes 80 of the heating panel 76.

Figure 4:
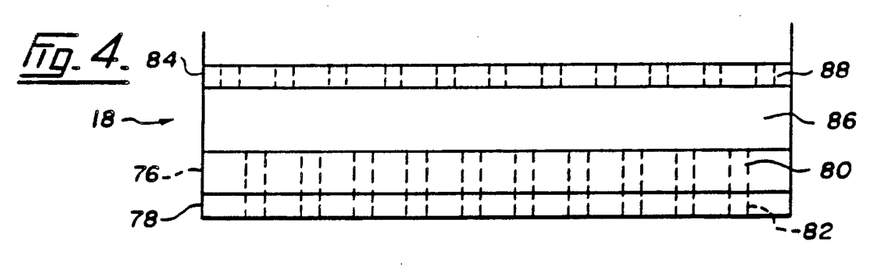
FIG. 4 is a sectional view of one type of heater panel that can be used in the machine of FIG. 1.

In use, plates 84 dampen the high velocity inert gas flow and cause it to become more uniform and the mass of the plates 84 causes the temperature in the chambers 86 to remain uniform. Chambers 86 act as pressure equalizers thereby maintaining substantially uniform convection through the heating panels 18.

Figure 5:
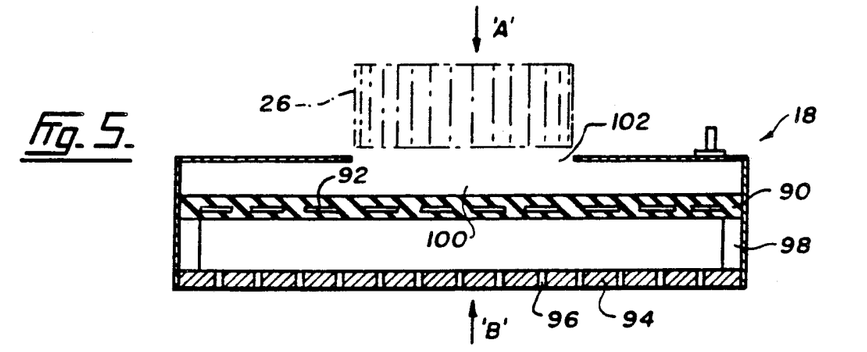
FIG. 5 is a sectional view of another type of heater panel that can be used in the machine of FIG. 1.
Figure 6:
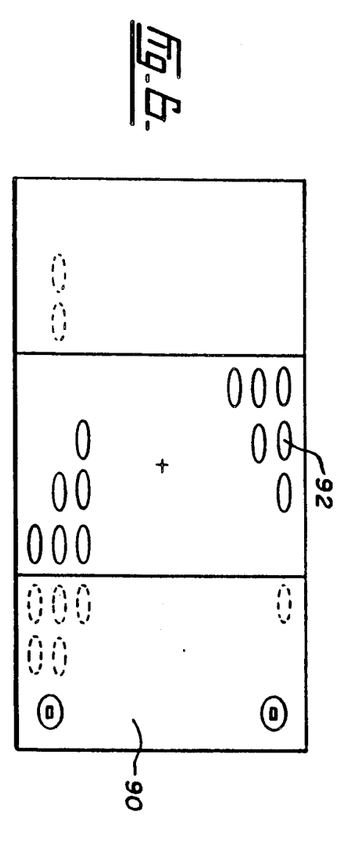
FIG. 6 is a top plan view, looking in the direction of arrow A in FIG. 5, and showing a part of the heater panel of FIG. 5.
Figure 7:
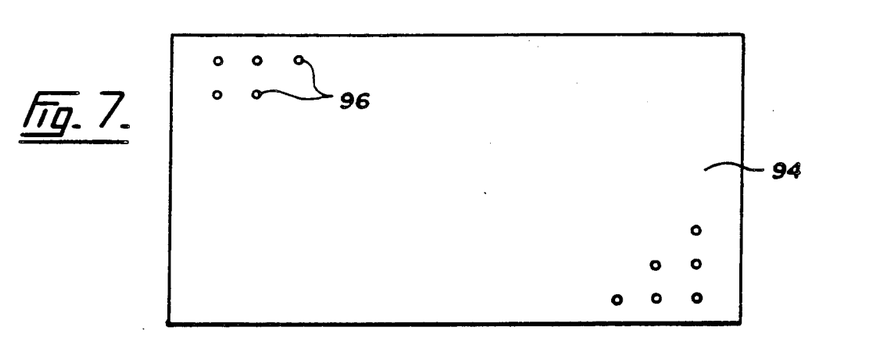
FIG. 7 is a bottom plan view, looking in the direction of arrow B in FIG. 5 and showing another part of the heater panel of FIG. 5.

FIGS. 5, 6 and 7 illustrate another form of heater panel 18 which can be used advantageously with the present invention. This comprises an insultative mat 90 encompassing electrical heating elements. The mat 90 is provided with short slots 92 spaced over the surfaced of the mat extending between the two major surfaces of the mat 90. Spaced from the underside of mat 90 is an aluminum plate 94 having through apertures 96 which may or may not be aligned with the slots 94 as desired. Metal spacers 98 are provided at the extremeties of the panel 18 to define the spacing between plate 94 and mat 90. The spacers may be provided at only two sides or at all four sides. Above the mat 90 a chamber 100 is provided with a port 102 adjacent the lower end of the fan.

Figure 8:
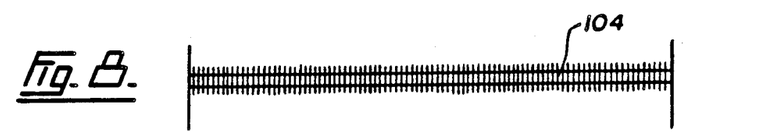
FIG. 8 is a sectional view of yet another type of heater panel that can be used.
Figure 9:
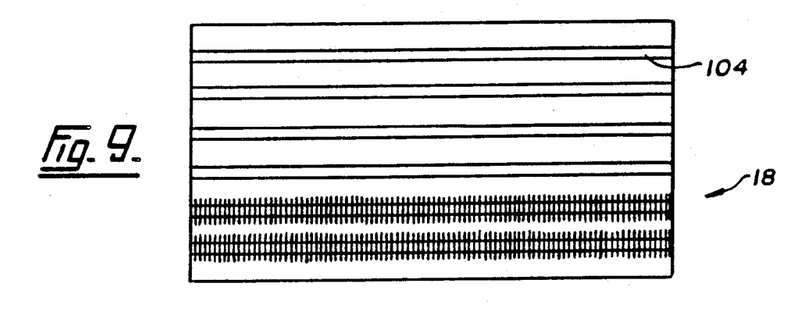
FIG. 9 is a plan view of the heater panel of FIG. 8.

Turning now to FIGS. 8 and 9, further form of heater panel 18 is illustrated. This takes the form of a plurality of rod elements 104 with or without fins. The elements 104 are secured parallel to one another within a rectangular frame and the spacing between the elements determines the effective size of apertures through the panel.

Figure 10:
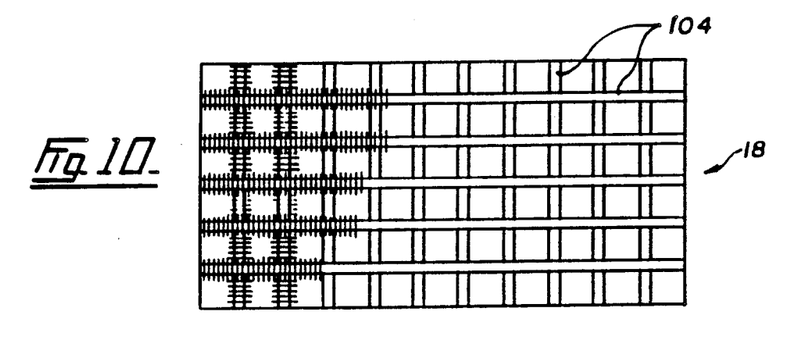
FIG. 10 is a plan view of a further type of heater panel that can be used in the invention.

In FIG. 10, there is a second plurality of the rod elements 104 which run orthogonally with respect to the first plurality. Again, the spacing between the rods determines the size of the apertures.

Figure 3:
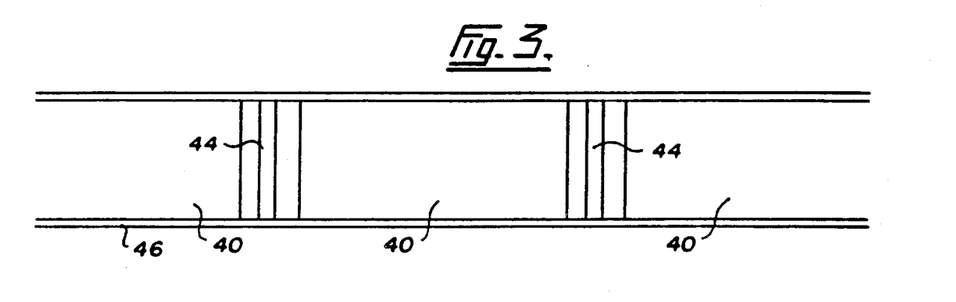
FIG. 3 is a schematic sectional view looking in the direction of arrow B in FIG. 1.
Figure 11:
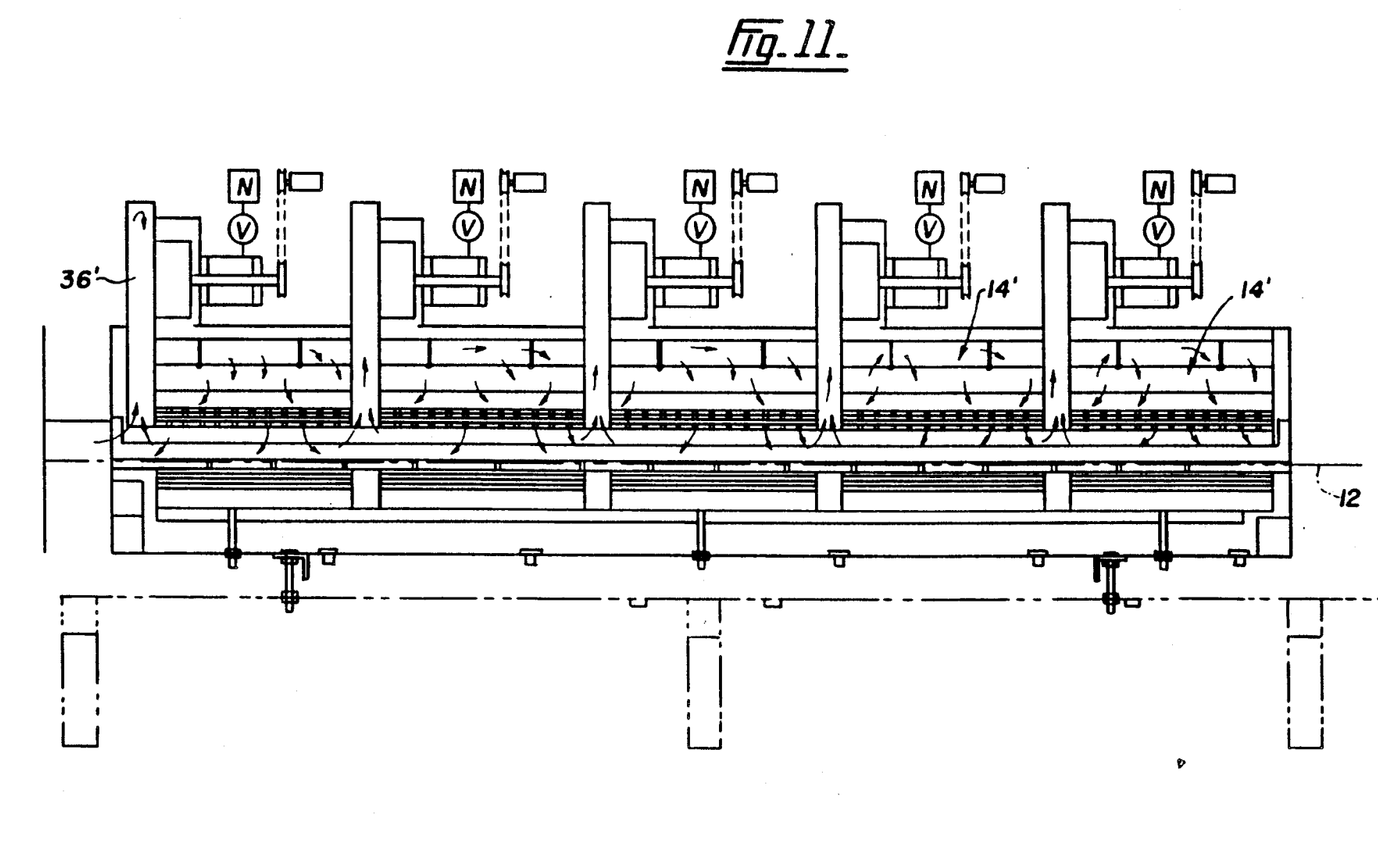
FIG. 11 is a schematic view showing in longitudinal section another embodiment of IR reflow soldering machine embodying the invention.
Figure 12:
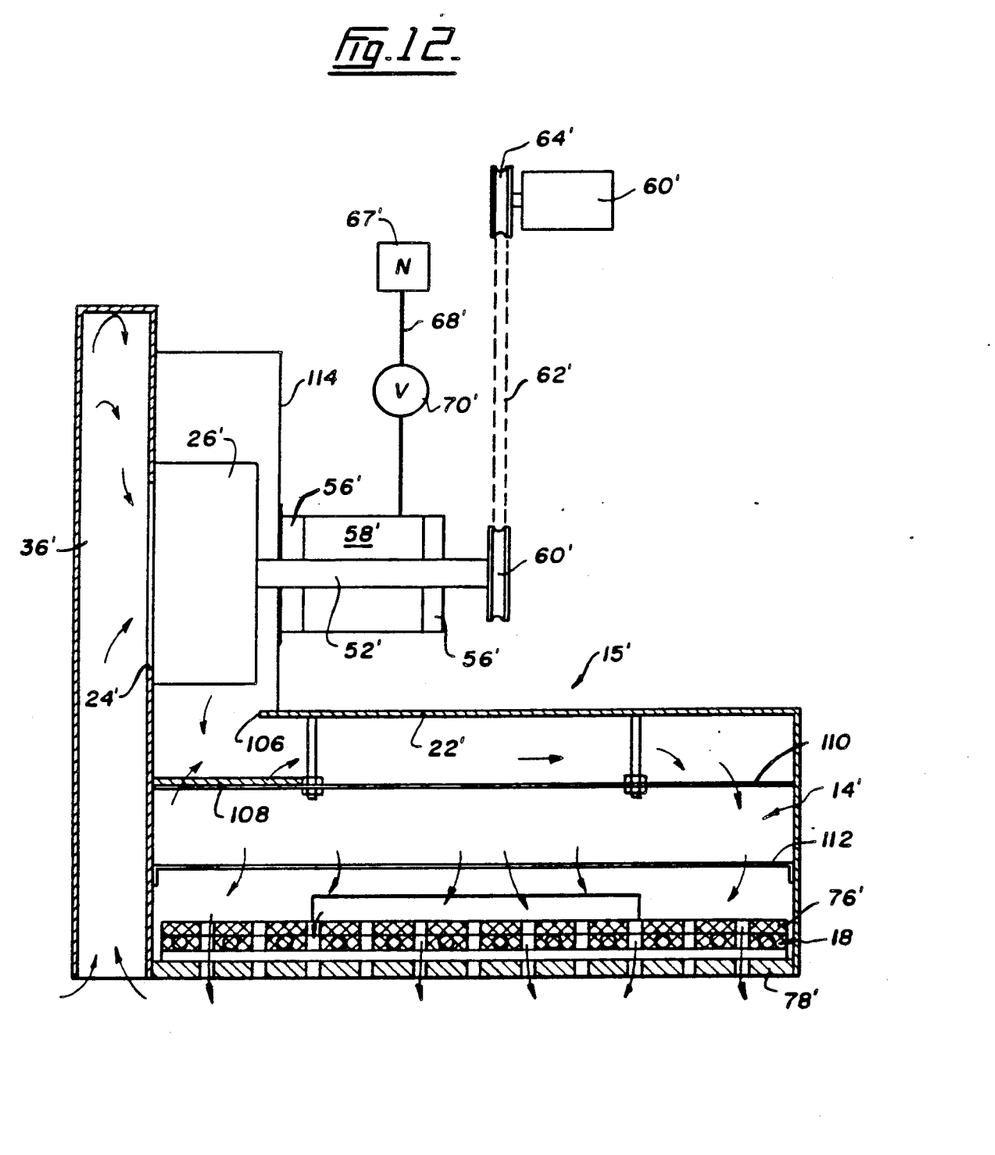
FIG. 12 is an enlarged view of a portion of FIG. 11.

FIGS. 11 and 12 show a soldering machine similar in principle to that illustrated in FIGS. 1 to 3. However, in this case the fan shafts 52' are disposed horizontally above the respective modules 14' and do not penetrate the housing 15'. There is no exact counterpart to housing 16. Instead a single gas channel 36' is provided at one end of the module and extends upwardly above the housing 15'. As indicated by the arrows inert gas is sucked up channel 36', through the fan 26' via inlet port 24' and back out through and exit port 106 in the roof 22' of housing 15'. A deflector plate 108 redirects the inert gas towards the centre of the module. Two vertically spaced perforated sheets 110, 112 extend across the housing 15' and an infrared heater panel 18' closes off the bottom of the housing. Heater panel 18' is similar in construction to the lower portion of the heater shown in FIG. 4, consisting of an infrared heating panel 76' and a perforated aluminum plate 78'.

The horizontal fan shaft 52' extends through a vertical wall 114 of housing 15' and a gas seal 58' surrounds the shaft 52' and bearings 56' as described in the embodiment of FIG. 1-3. Also, as shown in FIGS. 1-3, a pulley 60', drive belt 62' and pulley 64' connect the fan shaft 52 to the drive shaft of a remote electric motor 66'. Finally, a source of inert gas 67' is connected through pipes 68' and pump 70' to gas seal 58'.

In an alternative embodiment, gas seal 58 may be located intermediate bearing 56' and wall 114, accordingly not located intermediate bearings 56!

Figure 13:
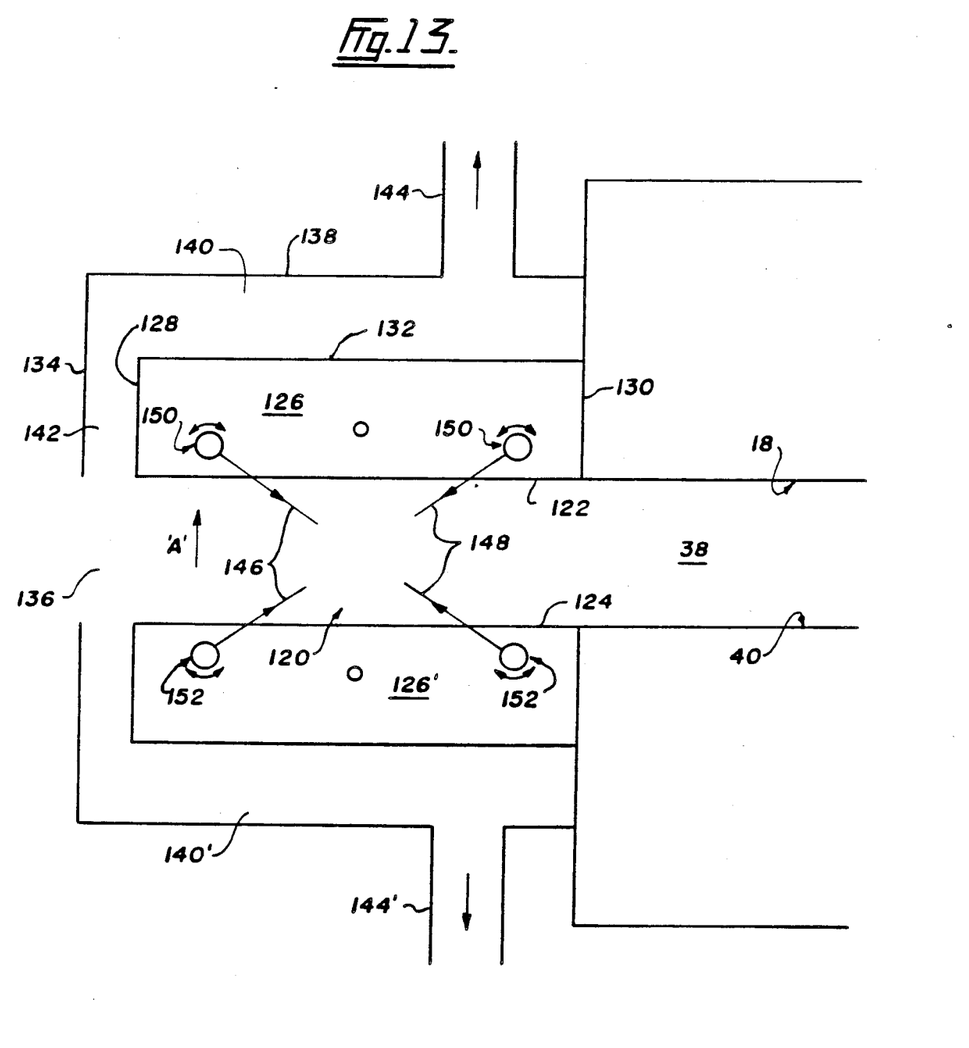
FIG. 13 is a schematic view showing in longitudinal section an entrance end portion of the IR reflow soldering machine of FIG. 1, particularly illustrating a novel gas curtain.
Figure 14:
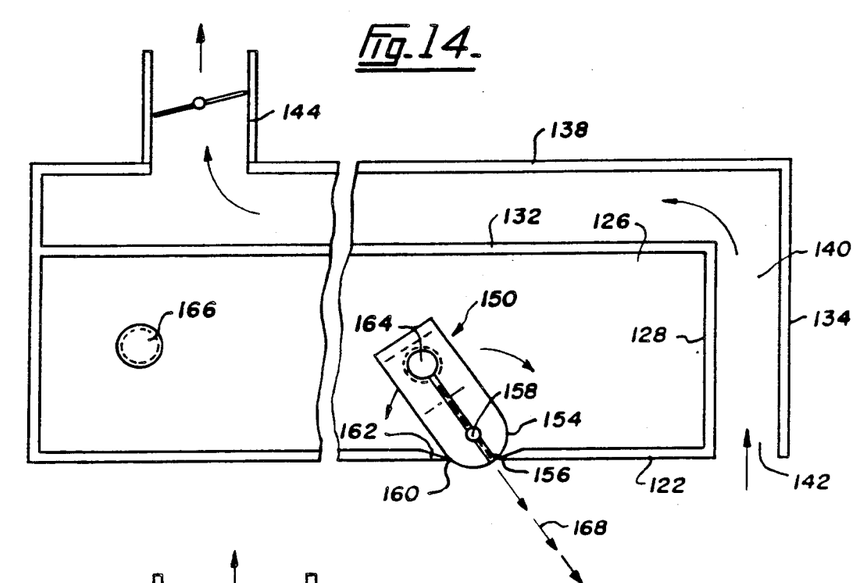
FIG. 14 is an enlarged view of a detail of the end portion of FIG. 13 but looking in the opposite direction.
Figure 15:
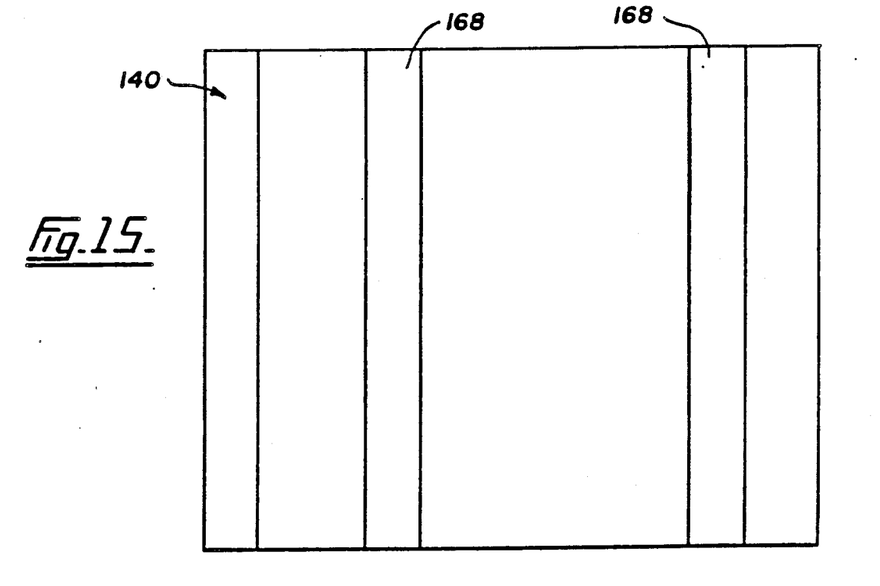
FIG. 15 is a schematic view looking in the direction of arrow A in FIG. 13.

With reference to FIG. 13 in conjunction with FIGS. 14 and 15, the entrance portion 120 of process tunnel 38 is defined by upper and lower sheet metal panels 122 and 124. A chamber 126 is formed above the tunnel entrance portion 120 and is defined by panel 122 front and rear sheet metal panels 128 and 130 and a top panel 132. Spaced forwardly of front panel 128 is a sheet metal panel 134 which has a lower edge defining the top of the entrance proper 136 of the tunnel and an upper edge joined to and edge of a horizontally extending sheet metal panel 138 an opposite edge of which is joined to panel 130.

An exhaust channel 140 having an entrance 142 adjacent the entrance 136 of the tunnel is defined by panels 134 and 128 and by panels 138 and 132. An exhaust duct 144 connecting with the exhaust channel 140 extends upwardly through panel 138. Exhaust channel 140', exhaust duct 144' and chamber 126', which are mirror images of channel 140, duct 144 and chamber 126, are provided at the underside of entrance 120.

A first gas curtain arrangement 146 is provided in the tunnel entrance 120 proximate the entrance 142 of channel 140 and a second gas curtain 148 is provided further along the tunnel towards plate 130. Each gas curtain arrangement is identical and so only one will be described in detail.

The gas curtain arrangement comprises an upper gas delivery member, referred to for convenience as a pipe 150 extending transversely with respect to the tunnel and a lower pipe 152 aligned below pipe 150. Pipe 150 is located partially inside upper chamber 126 as will be apparent from FIG. 14 and pipe 152 is located partically inside lower chamber 126'.

Referring specifically to FIG. 14, the pipe 150 is generally rectangular in section but with a curved lower edge 154 provided with a centrally disposed slot 156 running along the length of the pipe i.e., extending the full width of the tunnel 38. The pipe is pivotally mounted on a pivot pin 158 and can be clamped at any angular position within a predetermined range, e.g., 45°, by means of any suitable clamping means, not shown.

The pivot pin 158 extends parallel with the pipe 150 and is located proximate the inner surface of panel 122. A portion of the curved lower edge 154 projects through a slot 160 in panel 122, the slot extending parallel to the pivot pin. The slot 160 is shaped and dimensioned such that in the various pivoted positions of the pipe 150 the curved edge 154 substantially sealably engaged opposite edges of the slot 160. To this end the opposite edges may be chamfered as shown at 162.

Inert gas is supplied under pressure to pipe 150 by means of a supply pipe 164 such that a continuous stream or curtain of inert gas emanates from the slot 156. Inert gas is also supplied to the chamber 126 by means of a purge diffuser 166.

The gas curtain arrangement is operated as follows. The upper and lower pipes 150 of both pairs are pivoted to desired positions and clamped. Optimum positions can be determined by trial and error. In one configuration which proved effective in substantially preventing the ingress of air, all four pipes were pivoted such that all four gas curtains 168 were aimed slightly towards the entrance 136 rather than directly across the tunnel, with each pair of gas curtains converging midway between panels 122 and 124.

Inert gas is provided in chamber 126 so that any gap between curved edge 154 and slot 160 will simply cause more inert gas to be pressured into the tunnel proximate the gas curtains.

Exhaust duct 144 is connected to a fan which creates a partial vacuum in exhaust channel 140 which reduces the tendency of ambient air from passing through the gas curtains because the inert gas pressure behind the gas curtains is greater than air pressure in front of the gas curtains. In other words, the gas flow direction tends to be outwardly through the gas curtains and into the exhaust channels 140.

The operation of the gas curtain will now be described in greater detail with reference to FIG. 17 which is a longitudinal sectional view at one end of the tunnel 38. A printed circuit board 176 is shown passing through the tunnel end and as it does it intersects the gas curtains 168. Because the gas curtains are angled towards the adjacent tunnel end, the gas flow is entrained along the top and bottom surfaces of printed circuit board 176 towards the exhaust channel entrances 142 and then sucked out through exhaust channels 140. When no printed circuit board is present, the colliding flows of the top and bottom curtains 168 entrain together and move towards the exhaust entrance 142 in similar manner.

It will be appreciated from the above description that the combination of the inclining of the gas curtains with the provision of adjacent exhaust channels gives rise to the extremely high sealing obtained by the present invention. Thus, when the gas curtain arrangement is being set up, not only is the angle of inclination of the curtains important but in addition the exhaust pressures should be adjusted to obtain proper balance resulting in the desired path of the gas forming the curtains.

Figure 18:
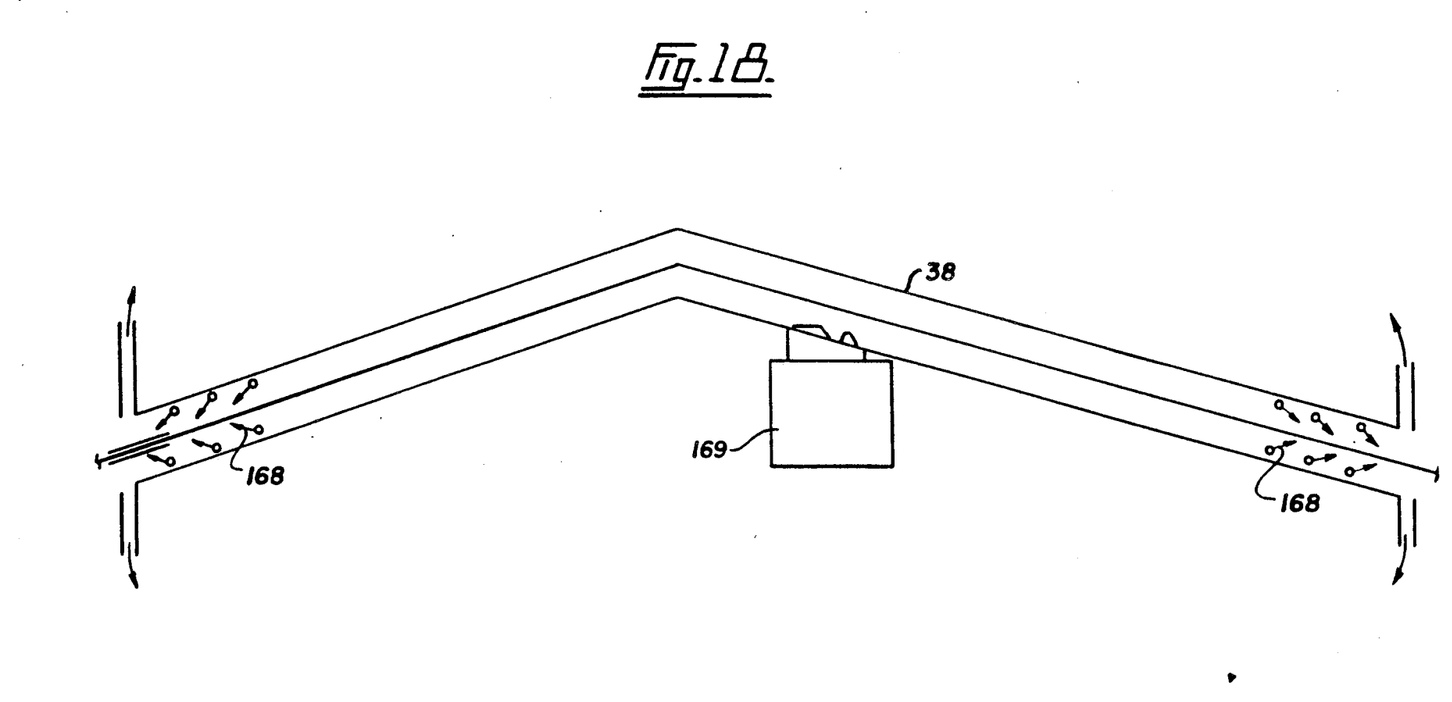
FIG. 18 is a schematic view showing in longitudinal section an automatic wave soldering machine incorporating the novel gas curtains.

Referring now to FIG. 18, this shows a wave soldering system incorporating the novel gas curtain arrangement. In a typical wave soldering system the conveyor tunnel 38 is inclined at both ends with respect to the horizontal. The angle of inclination of the gas curtains 168 is adjusted accordingly to compensate for such inclination so as to provide a balanced or stable system.

Figure 19:
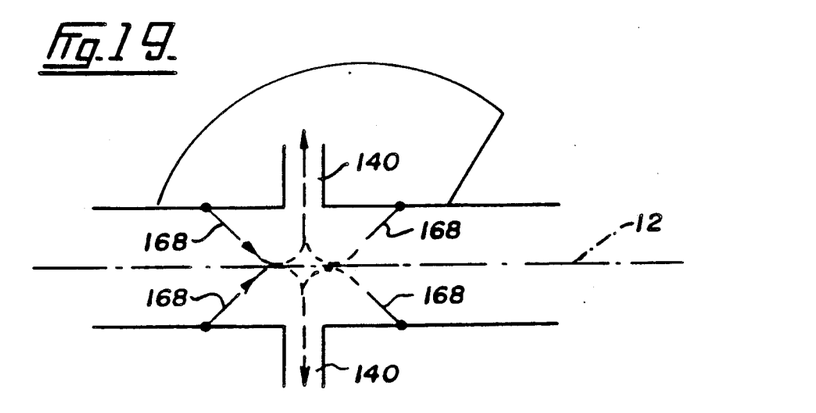
FIG. 19 is a diagram illustrating schematically a modified gas curtain for use at locations other than the entry and exit ends of the conveyor tunnel.

Turning now to FIG. 19, this shows a gas curtain arrangement based on the same principles as the others described thus far. However, instead of the gas curtain arrangement being provided at ann end of the conveyor or tunnel, in this embodiment the gas curtain arrangement is produced at a point between the ends. Such as gas curtain arrangement can be used for dividing the conveyor into mutually sealed zones. As shown, there are two pairs of spaced gas curtains 168 and two spaced exhaust channels 140 as before. However, the exhaust channels 140 are positioned intermediate each pair of gas curtains 168 with both pairs of gas curtains being angled towards the exhaust channels. The gas curtain converge as shown with the gas flowing out of the exhaust channels.

Figure 17:
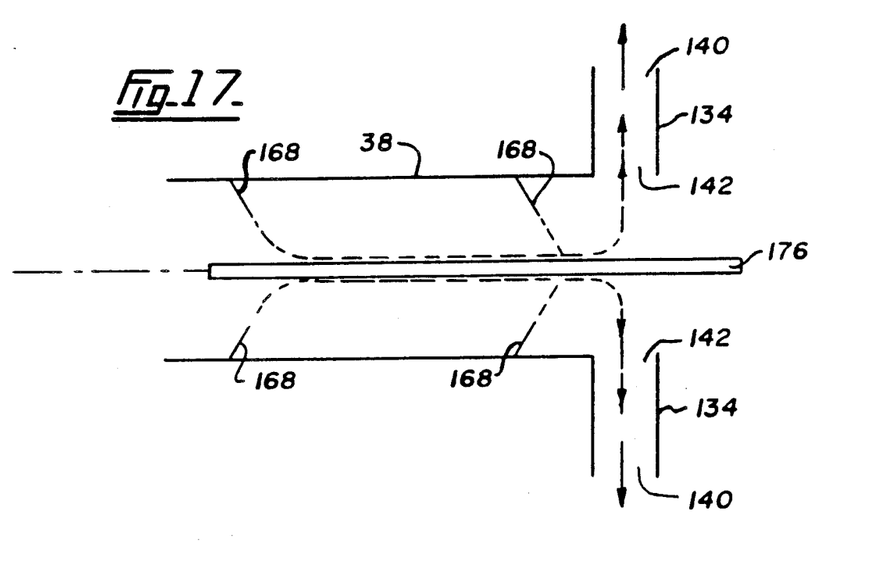
FIG. 17 is a diagram illustrating schematically the operation of the gas curtains.

In this embodiment as in the embodiment of FIG. 17 the exhaust channels, instead of being true exhausts, could serve as circulation channels which convey the gas to other parts of the tunnel.

Figure 20:
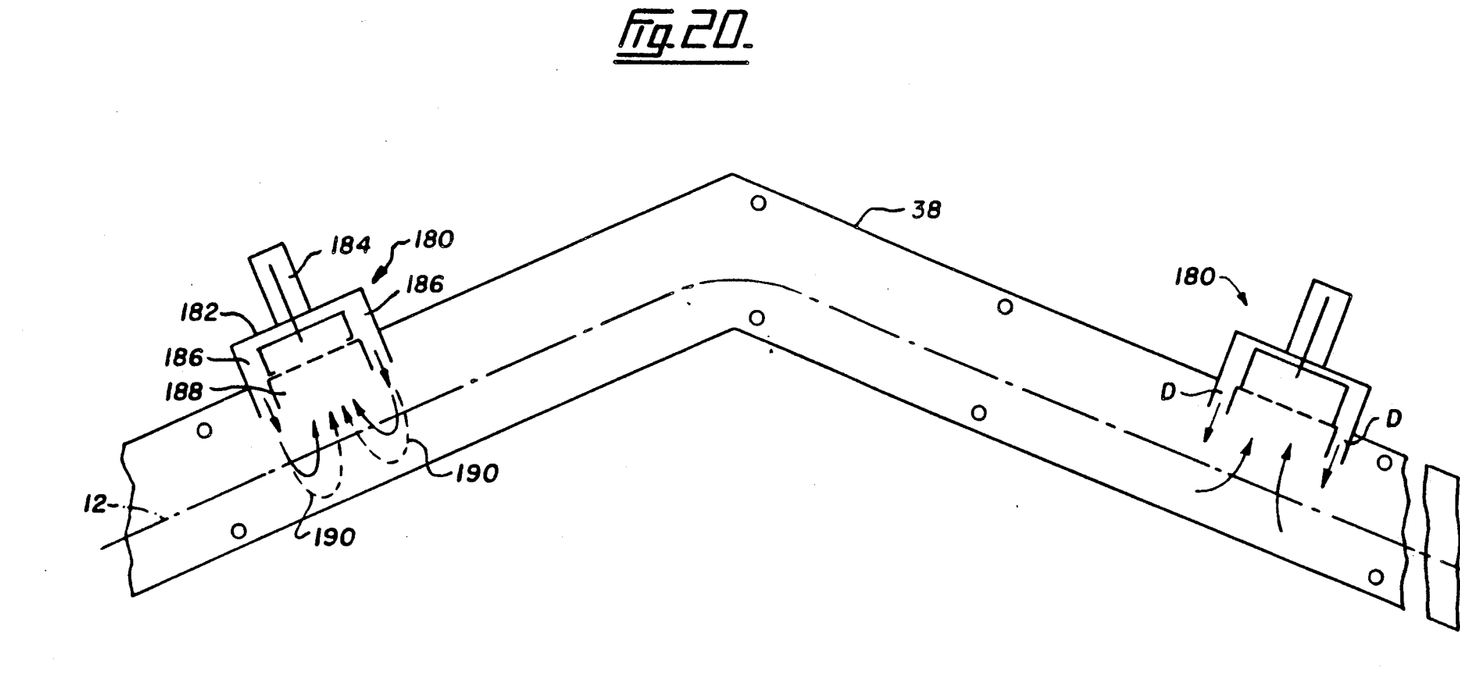
FIG. 20 is a schematic view showing in longitudinal section a portion of an automatic wave soldering machine incorporating a further type of gas curtain.

This concept of recirculatory flow is the basis for the gas curtain arrangements 180 shown in FIG. 20. The gas curtain arrangements are shown installed in a wave soldering system but the concept could equally well be applied to an IR soldering system. The gas curtain arrangements 180 can be used to divide the tunnel up into sealed zones or could be used only at the entrance and exit of the tunnel. In either case, each gas curtain arrangement 180 comprises a housing 182 for a blower 184. The housing 182 is formed with a narrow duct 186 at each of a forward end and a trailing end and a wide duct 188 located between ducts 186.

In operation, gas is pulled up through duct 188 by blower 184 and then forced down ducts 186 also by blower 184. When no printed circuit board is present the gas curtains 190 impinge on the floor of the tunnel. The gas curtains 190 could be aligned substantially perpendicularly with respect to the conveyor axis or the ducts 186 could be designed such that the gas curtains 190 are inclined slightly towards each other. The presence of a printed circuit board would tend to interrupt the gas curtains and prevent complete sealing and so it is preferred that an identical gas curtain arrangement (not shown) be placed opposite each gas curtain arrangement 180 to direct gas curtains upwards onto the underside of the printed circuit board.

All of the novel gas curtain arrangements described above are applicable to other processes where gas seals are important, not only to inert IR and wave soldering systems.

Figure 16:
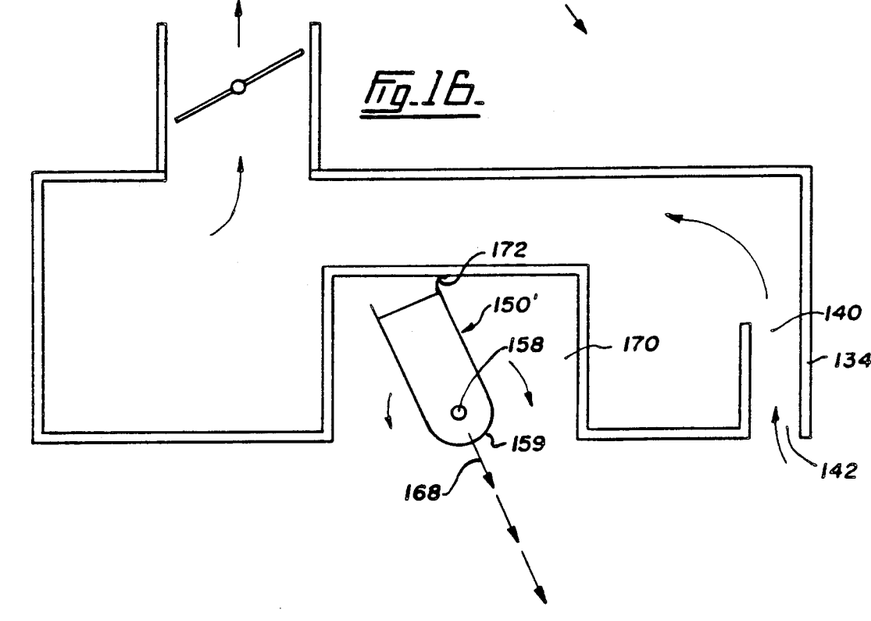
FIG. 16 is a view similar to FIG. 14 but illustrating a modified arrangement.

FIG. 16 shows an alternate mounting arrangement for the gas curtain pipes 150'. Each pipe is mounted in a recess 170 in the tunnel entrance portion rather than in a separate chamber. Preferably the edge of the pipe 150' remote from the pipe slot should be adapted to engage sealably with the recess wall, possibly by means of a flexible strip shown schematically at 172. In all other respects the gas curtain arrangement of FIG. 16 is identical with that of FIG. 14.

Although two gas curtain arrangements have been shown proximate entrance 136, it will be understood that in certain cases one such curtain arrangement may be sufficient or that additional spaced curtain arrangements will enhance sealing. It will be understood also that the angle selected for the gas that the dimensions of the conveyor or tunnel and the gas pressure would play a part in determining the optimum gas curtain angle. It should not be ruled out that the angle of the lower gas curtain could be different from that of the upper gas curtain.

Also, although the gas curtains are shown emanating from the top and bottom of the tunnel it is envisaged that in some applications they could be directed from opposed sides of the tunnel.

Figure 21:
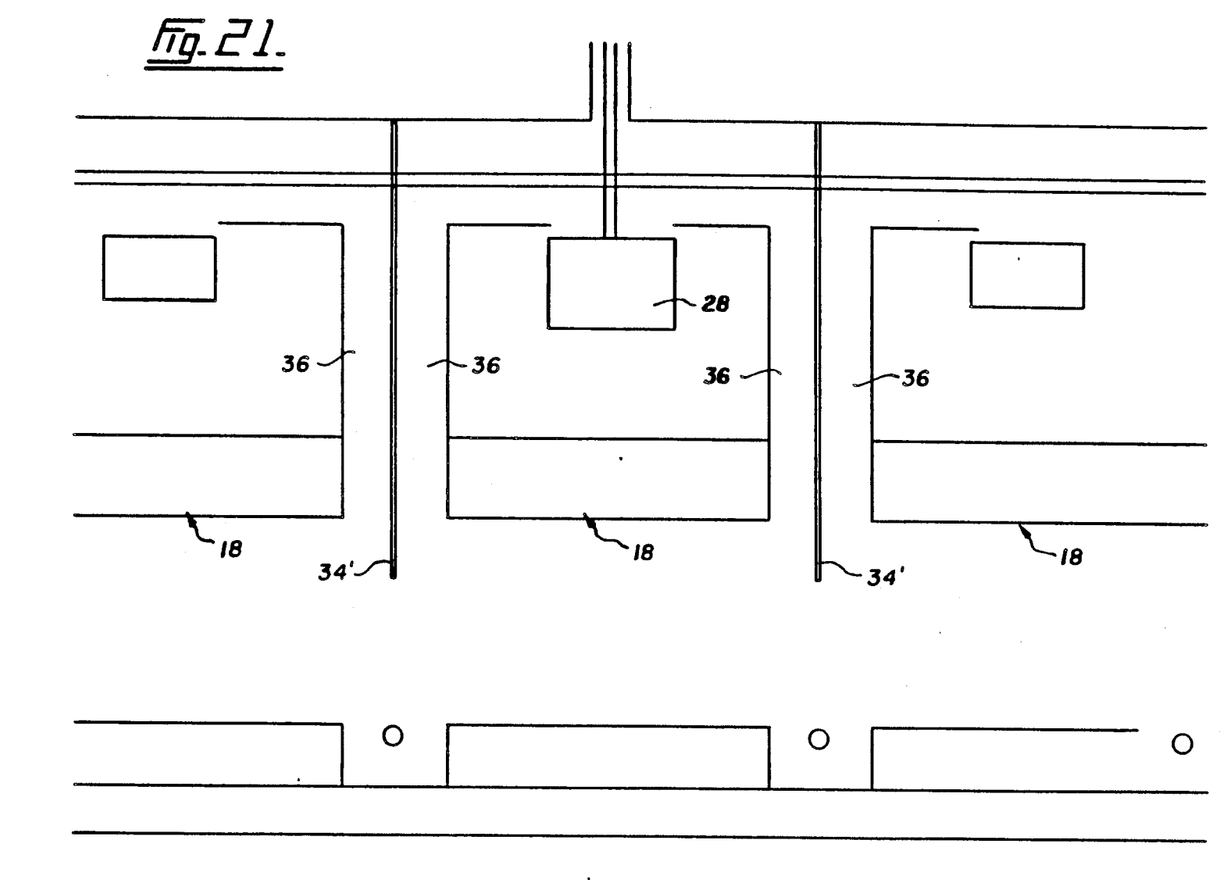
FIG. 21 is a view generally similar to FIG. 1 but illustrating a modified separator plate arrangement.

Turning now to FIG. 21, this shows a modification of the machine of FIG. 1 in which the separator plates 34', which are located between successive pairs of heater modules, are extended downwards beyond the lower edge of the heater panels 18. In all other respects the machine is unchanged. The effect of extending the separator plates is to permit the modules to behave more independently of each other and thereby improve gas flow. This is because, as gas is forced down through a heater panel 18 and back up channels 36 to the fan 26, the flower edge portions of the separator plates reduce the flow from one module into an adjacent one.

Finally, although FIGS. 1 and 17 show the lower heaters 40 as being non-apertured, the lower heaters could be made identical to the apertured upper heater panels 18 and, indeed, the entire structure above the conveyor could be mirror-imaged below.

I claim:

1. A gas curtain arrangement for providing a gas seal across a tunnel comprising means adjacent one wall of the tunnel for providing a first gas curtain and means adjacent an opposite wall of the tunnel for providing a second gas curtain, the curtains not being aligned but being angled to intersect each other within the tunnel.

2. A gas arrangement for providing a gas seal across an access of a process tunnel of an inert gas soldering machine comprising means adjacent a top wall of the tunnel for providing a first inert gas curtain and means adjacent the bottom wall of the tunnel for providing a second inert gas curtain, the curtains being angled so that they converge towards the access and intersect with each other within the tunnel.

3. A gas curtain arrangement according to claim 2 in which the first curtain emanates from a point directly above the point at which the second curtain emanates.

4. A gas curtain arrangement according to claim 3 in which third and fourth inert gas curtains are provided spaced from the first and second gas curtains, the third and fourth gas curtains being identical in configuration to the first and second gas curtains.

5. A gas curtain arrangement according to claim 2 in which the angles of each gas curtain may be varied as desired.

6. A gas curtain arrangement according to claim 5, in which each gas curtain is derived from a pivotable and clampable pipe.

7. A gas curtain arrangement according to claim 6 in which the pipe is located in the tunnel adjacent a wall thereof and sealably engages the adjacent tunnel wall.

8. A machine for reflow soldering components on printed circuit boards, comprising a conveyor for the printed circuit boards, a housing through which the conveyor passes, sealing means provided at entry and exit ends of the conveyor with respect to the housing, means for introducing an inert gas into the housing, aperture heating panels disposed in the housing above the conveyor, fan means located in the housing for forcing inert gas through the apertured heating panels onto the conveyor, the fan means having a fan shaft protruding through a wall of the housing for connection to a drive means, and a gas seal provided at the location where the fans shaft protrudes through the wall of the housing to prevent ingress of ambient air into the housing, the sealing means at entry and exit ends of the conveyor each comprising a gas curtain arrangement including first and second inert gas curtains, arranged on the opposite sides of the conveyor, the curtains being angled so that they converge towards one of the entry and exit and intersect with each other.

9. A gas curtain arrangement for providing a gas curtain across a tunnel comprising a first pipe having a slot extending across one wall of the tunnel and located proximate the one wall, means for supplying gas under pressure to the first pipe whereby a first gas curtain extends from the slot across the tunnel to another wall of the tunnel opposite the one wall, and means for securing the first pipe at different desired angular positions such that the angle of the gas curtain with respect to a cross-sectional plane through the tunnel may be varied as desired.

10. A gas curtain arrangement according to claim 9 comprising a second pipe having a slot extending across another wall of the tunnel opposite the one wall and located proximate the other wall, means for supplying gas under pressure to the second pipe whereby a second gas curtain extends across the tunnel to intersect the first gas curtain and means for securing the second pipe at different desired angular positions such that the angle of the second gas curtain with respect to a cross-sectional plane through the tunnel may be varied as desired.

11. A gas curtain according to claim 10 in which the slot of the first pipe is located adjacent a top wall of the tunnel and the slot of the second pipe is located adjacent a bottom wall of the tunnel, the two slots being substantially in alignment.

12. A gas curtain arrangement as claimed in claim 11 in which the first and second pipes are pivotally mounted and the means for securing are clamping means.

13. A gas curtain arrangment as claimed in claim 12, in which, in addition to the first and second pipes there are provided third and fourth pipes identically configured and positioned as regards the first and second pipes except that the third and fourth pipes are displaced along the tunnel from the first and second pipes.

14. A gas curtain arrangement for providing a gas seal across a tunnel comprising a blower, first and second ducts mutually spaced along the tunnel and a third duct located at a position between the first and second ducts, the three ducts communicating with the blower such that gas is blown down the first and second ducts to form first and second gas curtains and gas from the curtains is drawn up through the third duct and recirculated to the first and second ducts.

15. A gas curtain arrangement for providing a gas seal across an access of a process tunnel of an inert gas soldering maching comprising means adjacent a top wall of the tunnel for providing a first inert gas curtain and means adjacent the bottom wall of the tunnel for providing a second inert gas curtain, the curtains being angled so that they converge towards the access and intersect with each other, the angles of each gas curtain may be varied as desired, each gas curtain is derived from a pivotable and clampable pipe, the pipe located in an inert gas chamber adjacent the tunnel, and the pipe having a slotted portion projecting through a slot in a tunnel wall.

16. A gas curtain arrangement for providing a gas seal across a tunnel comprising means adjacent one wall of the tunnel for providing a first gas curtain and means adjacent an opposite wall of the tunnel for providing a second gas curtain, the curtains not being aligned but being angled to intersect each other, a first exhaust duct provided on the one wall of the tunnel and a second exhaust duct provided on the opposite wall of the tunnel, the ducts being spaced from the means for providing the first and second gas curtains in the direction of inclination of the curtains such that after the curtains intersect the gas passes through the exhaust ducts.

17. A gas curtain arrangement according to claim 16 further comprising means adjacent the one wall for providing a third gas curtain and means adjacent the opposite wall for providing a fourth gas curtain, the first exhaust duct being located between the first and third gas curtains and the second exhaust duct being located between the second and fourth gas curtains, and the third and fourth gas curtains being angled in a direction opposite that of the first and second gas curtains.

* * * * *